United States Patent
Fortenbery

[11] Patent Number: 6,095,314
[45] Date of Patent: Aug. 1, 2000

[54] MULTI-CELL CHUTE FOR A TILT TRAY SORTER

[75] Inventor: J. David Fortenbery, Charlotte, N.C.

[73] Assignee: Mantissa Corporation, Charlotte, N.C.

[21] Appl. No.: 09/118,410

[22] Filed: Jul. 17, 1998

[51] Int. Cl.$^7$ .................................................. B65G 47/46
[52] U.S. Cl. ..................................... 198/360; 198/370.04
[58] Field of Search ........................... 198/349.5, 349.95, 198/360, 361, 370.03, 370.04

[56] References Cited

U.S. PATENT DOCUMENTS

| | | | |
|---|---|---|---|
| 968,053 | 8/1910 | Heldmann | 198/360 |
| 1,969,276 | 8/1934 | Pevear | 198/361 |
| 3,136,401 | 6/1964 | Atanasoffe et al. | 193/32 |
| 3,880,298 | 4/1975 | Habegger et al. | 198/349.95 |
| 5,220,986 | 6/1993 | Winkler, III | 193/25 |

Primary Examiner—Jospeh E. Valenza
Attorney, Agent, or Firm—Rhodes & Mason, PLLC

[57] ABSTRACT

A multi-cell discharge chute for a material handling system including a plurality of tilt trays. The chute includes at least three cells arranged generally perpendicular to the travel of the material handling system and aligned with respect to one another and a plurality of guide pans associated with each of the cells. A diverter door located between the material handling system and the inlets of each of the plurality of guide pans. The diverter door is movable between each of the inlets by a multi-position actuator whereby the multi-cell discharge chute is operable to selectively discharge articles from the material handling system into each of the cells. In the preferred embodiment the chute includes a discharge control system for preventing the material handling system for discharging an article into more than one of the aligned cells within a predetermined delay time thereby preventing the material handling system from discharging an article into a cell before the discharge chute is positioned with respect to the cell.

32 Claims, 3 Drawing Sheets

MULTI-CELL CHUTE FOR A TILT TRAY SORTER

BACKGROUND OF THE INVENTION

(1) Field of the Invention

The present invention relates generally to material handling systems and, more particularly, to an improved discharge chute for use with tilt tray sorter material handling systems.

(2) Description of the Prior Art

Conventional tilt tray sorters discharge their goods onto individual chutes located near each packer. The upper surfaces of the chutes are formed from stainless steel or corrosion resistant aluminum, polyethylene, wood, plastic, fiberglass, or other similar, low friction material in order to stand up against the constant wear and tear of day in and day out usage. One example of such a chute is shown in U.S. Pat. No. 5,220,986 issued Jun. 22, 1993 to Fortenbery.

However, the cost of a sorter is about $1500 per linear foot. Accordingly, it is well known to discharge on both sides of the sorter to double its capacity. It is also known to use a two-position chute which can unload articles to two separate cells at one chute location therefore also doubling the sorter's granularity. Granularity is defined as the number of distribution points or cells per conveyor length. However, because of the high cost per foot of the sorter there still remains a need for even further increases in discharge granularity.

Thus, there remains a need for a new and improved chute for material handling applications which further increases discharge density at least 150% while, at the same time, is economical to manufacture and maintain.

SUMMARY OF THE INVENTION

The present invention is directed to a multi-cell discharge chute for a material handling system including a plurality of tilt trays. The chute includes at least three cells arranged generally perpendicular to the travel of the material handling system and aligned with respect to one another and a plurality of guide pans associated with each of the cells. A diverter door is located between the material handling system and the inlets of each of the plurality of guide pans. The diverter door is movable between each of the inlets by a multi-position actuator whereby the multi-cell discharge chute is operable to selectively discharge articles from the material handling system into each of the cells. In the preferred embodiment the multi-position actuator is a tandem pneumatic cylinder having air cushions at each end stop to reduce noise created by operation of the cylinder when it reaches the end of its stroke.

In the preferred embodiment, the chute includes a discharge control system for preventing the material handling system from discharging an article into more than one of the aligned cells within a predetermined delay time thereby preventing the material handling system from discharging an article into a cell before the discharge chute is positioned with respect to the cell.

Accordingly, one aspect of the present invention is to provide a multi-cell discharge chute for a material handling system including a plurality of tilt trays. The chute includes: (a) a plurality of cells arranged generally perpendicular to the travel of the material handling system and aligned with respect to one another; (b) a plurality of guide pans associated with each of the cells; and (c) a diverter door located between the material handling system and the inlets of each of the plurality of guide pans, the diverter door being movable between each of the inlets whereby the multi-cell discharge chute is operable to selectively discharge articles from the material handling system into each of the plurality of cells.

Another aspect of the present invention is to provide a multi-cell discharge chute for a material handling system including a plurality of tilt trays. The chute includes: (a) at least three cells arranged generally perpendicular to the travel of the material handling system and aligned with respect to one another; (b) a plurality of guide pans associated with each of the cells; and (c) a diverter door located between the material handling system and the inlets of each of the plurality of guide pans, the diverter door being movable between each of the inlets whereby the multi-cell discharge chute is operable to selectively discharge articles from the material handling system into each of the cells.

Still another aspect of the present invention is to provide a multi-cell discharge chute for a material handling system including a plurality of tilt trays. The chute includes: (a) at least three cells arranged generally perpendicular to the travel of the material handling system and aligned with respect to one another; (b) a plurality of guide pans associated with each of the cells; (c) a diverter door located between the material handling system and the inlets of each of the plurality of guide pans, the diverter door being movable between each of the inlets whereby the multi-cell discharge chute is operable to selectively discharge articles from the material handling system into each of the cells; and (d) a discharge control system for preventing the material handling system from discharging an article into more than one of the aligned cells within a predetermined delay time thereby preventing the material handling system from discharging an article into a cell before the discharge chute is positioned with respect to the cell.

These and other aspects of the present invention will become apparent to those skilled in the art after a reading of the following description of the preferred embodiment when considered with the drawings.

DESCRIPTION OF THE PREFERRED EMBODIMENTS

Figure 1:
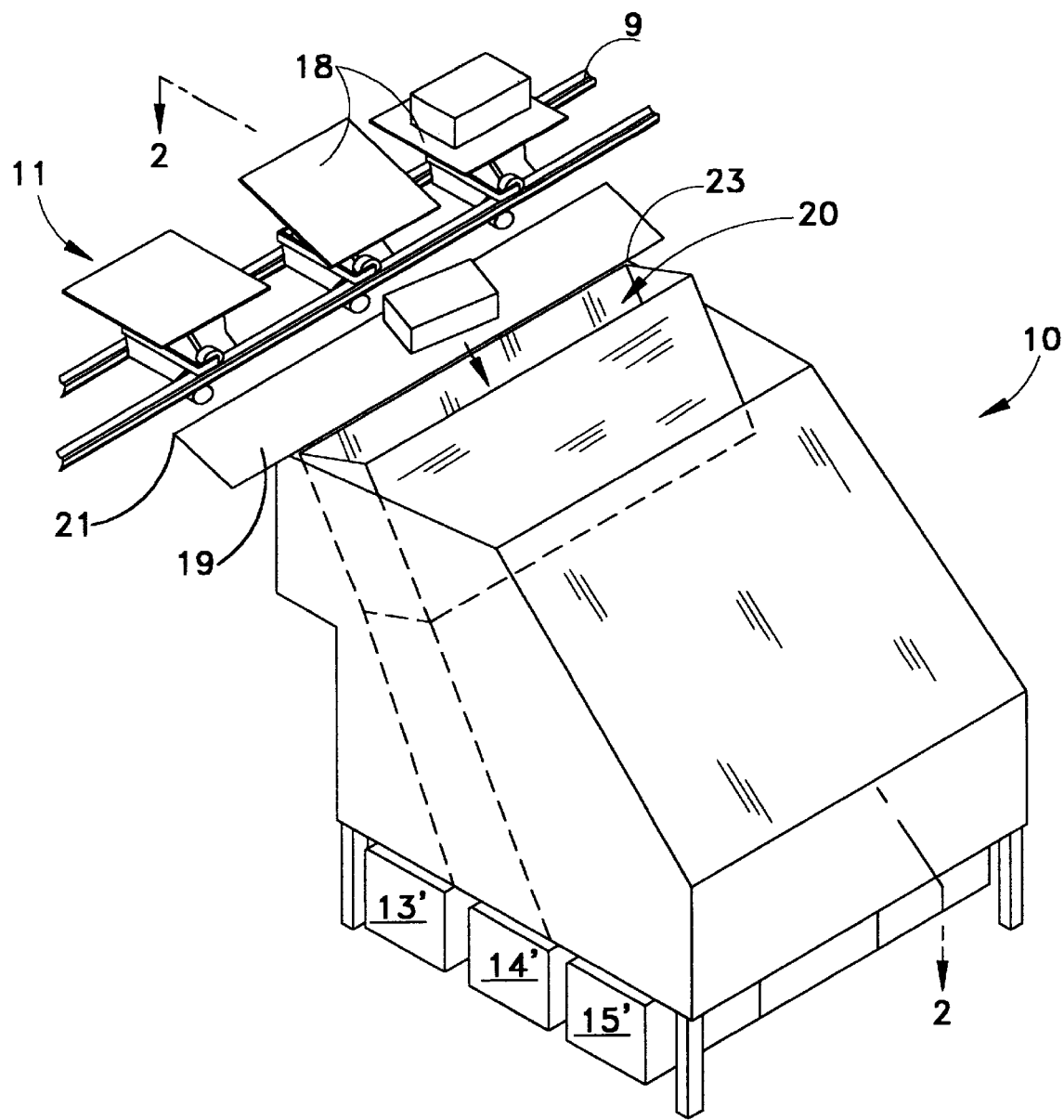
FIG. 1 is a perspective view of a multi-cell vertical chute constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a multi-cell chute, generally designated 10, is shown constructed according to the present invention for transporting and sorting articles carried by a sorter conveyor 11.

The multi-cell chute 10 includes a diverter door 20 variably positionable between at least three positions to direct the article into guide pans 13, 14, 15 which further direct the articles away from the conveyor. Cells A, B, and C located downstream capture the articles and may hold the articles until they are discharged into hoppers 13', 14', and 15'. A control system 45 tracks the movement of the articles throughout the sorter conveyor and the position of the elements of the multi-cell chutes 10.

The sorter conveyor 11 includes individual conveyor carts 18 that carry articles to the multi-cell chutes along the conveyor track 9. The conveyor carts 18 are actuated and tilted at the various multi-cell chute locations along the conveyor track thereby delivering the articles to the multi-cell chutes. The details of the conveyor carts 18 are included in U.S. patent application Ser. No. 08/632,012, herein incorporated by reference in its entirety. This type of conveyor system is often utilized in a distribution warehouse for preparing outgoing orders to customers. The system provides for a single conveyor system to simultaneously process numerous separate orders.

A platform 19 is positioned between the sorter conveyor 11 and the diverter door 20. Preferably, the front edge 21 of the platform is positioned under the sorter conveyor 11 to capture items being tilted from the conveyor carts 18 preventing them from missing the multi-cell chute. The platform is angled away from the sorter conveyor to continue the movement of the articles and prevent them from becoming stuck on the platform. Preferably, the platform back edge 23 is adjacent to the diverter door 20 to provide a smooth transition.

The diverter door 20 is located between the platform 19 and the guide pans 13, 14, 15. The diverter door 20 is preferably enclosed having a bottom section with opposing sides and a cover such that articles that are placed into the diverter door 20 do not tumble off the chute into another guide pan resulting in a mis-sorted item or onto the floor below the chute.

Figure 2:
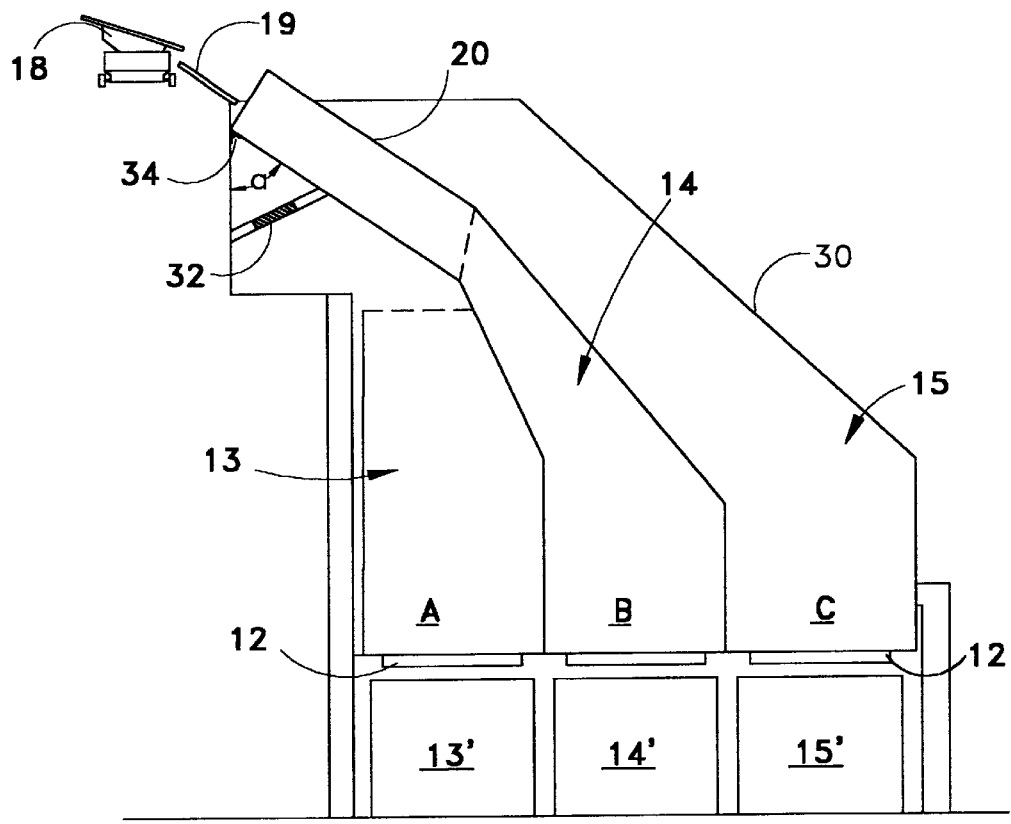
FIG. 2 is a cross-sectional view of the chute taken along the line 2—2 shown in FIG. 1.

The edge 34 of the diverter door closest to the platform 19 is pivotally attached to an upper edge of the multi-cell chute to allow the diverter door to swing along an arc between the cells and to feed articles into the guide pans. By way of example, the diverter door illustrated in FIG. 2 is positioned to feed articles into guide pan 14 and cell B. It will be understood by one skilled in the art that the diverter door 20 may feed to any number of cells and may have any number of shapes and designs.

A multi-position actuator 32 mounted between the bottom of the diverter door and the edge of the multi-cell chute controls the position of the diverter door 20. The actuator 32 is able to position the diverter door 20 at an angle of between about 0 to 90 degrees relative to the sorter conveyor 11. In one embodiment, the actuator is a tandem pneumatic cylinder Model # NCGBA32-UIA97015 manufactured by SMC Pneumatics, Inc. that is capable of placing the diverter door at three predetermined positions. In a preferred embodiment, the actuator includes adjustable air cushions at each end stop to eliminate or reduce noise at the end of the stroke.

The guide pans 13, 14, 15 are located downstream of the diverter door to further guide the article as it moves from the sorter conveyor. The guide pans are enclosed to prevent the articles from escaping as they pass along the length of the guide pan. In a preferred embodiment, the edge 30 of the outermost guide pan and cell is transparent to allow for viewing into the interior.

Figure 3:
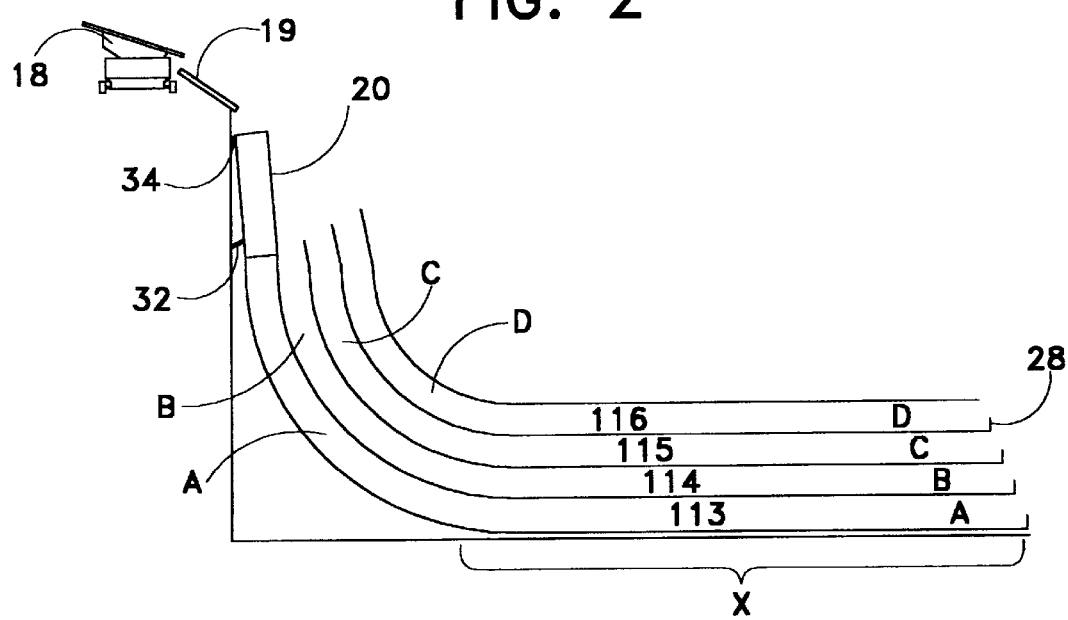
FIG. 3 is a cross-sectional view of a 4 cell horizontal chute constructed according to the present invention.

The cell regions A, B, C are located downstream of the guide pans and defined as the area between the guide pans and the hoppers 13', 14', 15'. The cell regions provide for transitioning the articles and further guiding and directing the articles as they move from the sorter conveyor. The cells may have a variety of orientations from substantially horizontal as illustrated in FIG. 3 to substantially vertical as illustrated in FIG. 2. Velocity placed upon the articles upon discharge from the carts 18 and the gravitational force as the articles vertically descend through the chute is sufficient to ensure the article reaches the downstream end of the feeder and does not become stuck within the chute.

Doors 12 are positioned on the ends of the cells as illustrated in FIG. 2. These doors function similar to bombays on airplanes having two opposing complementary doors that each extend across one half of the opening. The doors 12 act as an accumulator to store the articles within the cell until they move downstream into the hoppers. Keeping the doors closed until this time allows the hoppers to be moved in and out of the downstream position without requiring the control system to stop sending articles to the cell. Preferably, the control system 45 controls the functioning of the doors 12. The control system tracks the articles in each cell and the proper timing to open the doors to ensure an accurate order is processed with the correct number and type of articles. In one preferred embodiment, a sensor relays the position of the doors to the control system. The control system 45 further controls the timing of opening and closing the doors from throughout the system to prevent problems such as too many doors opening at one particular moment.

The hoppers 13', 14', 15' are positioned downstream of the doors 12 to catch the articles. It will be understood that the term hoppers may also include boxes, totes, containers, etc. For particular orders, the articles are coupled meaning they are shipped directly to customers without further sorting or packaging. Decoupled orders require the hoppers to be moved away from the multi-cell chutes and packaged at a remote location before distribution to the customer. Alternatively, as illustrated in FIG. 3, stops 28 may be positioned at the end of the guide pans and cells to stop the motion of the articles. In this arrangement, the articles can be removed from the cells and organized in the specific customer orders.

A discharge control system 45 monitors the entire sorter conveyor and multi-cell chute system. The control system includes a reading device to determine the articles placed upon the individuals conveyor carts 18, a means to calculate the position of the cart 18 along the conveyor track 9, and a means to calculate the position of the diverter door 20.

As the sorter conveyor moves articles about the system, the discharge control system determines whether an individual article can be discharged at a given multi-cell chute 10 and be eventually deposited in the correct tote. By way of example as shown in FIG. 2, an article discharged into the multi-cell chute to be deposited in tote 15' will not be deposited correctly as the diverter door 20 is in position to guide articles into tote 14'. The discharge control system monitors the variables involved in the moving system to ensure the accuracy of the system.

Figure 4:
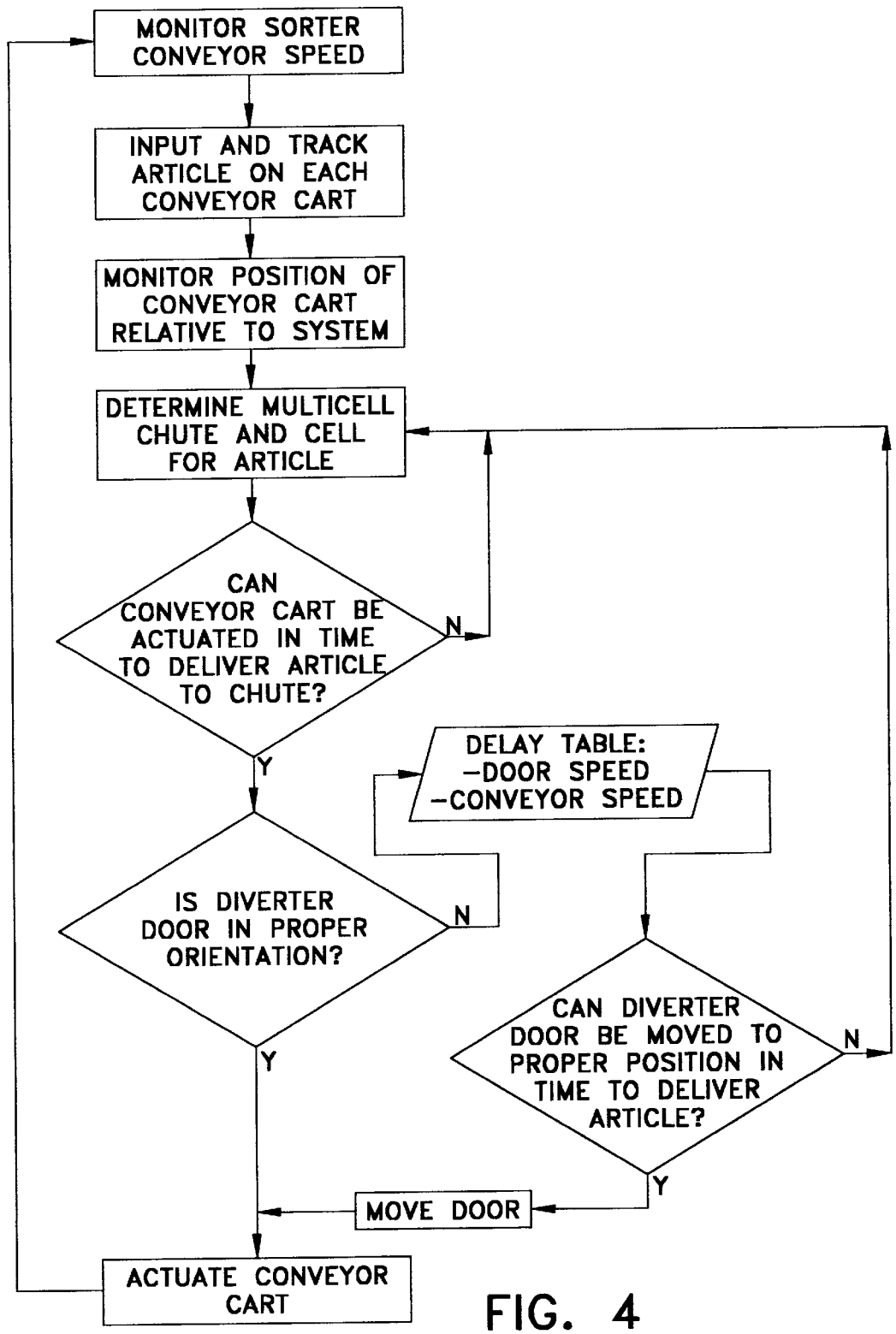
FIG. 4 is a flowchart diagram illustrating the discharge control system.

A first variable monitored by the discharge control system is the position of the diverter door 20 and the amount of time necessary for the door to be positioned into the proper orientation for the discharged article to reach the correct tote. As shown in FIG. 4, a delay table 50 contains the amount of time necessary for each diverter door in the entire system to be reoriented to the various positions. The time for the door to move positions may be dependant upon such factors as the length of the door, the weight of the door, and speed of the multi-position actuator controlling the door. The discharge control system 45 must further track whether any articles are within the length of the diverter door 20. The system 45 must wait until the articles have passed through the length of the door prior to moving the position to ensure these contained articles are delivered to the correct guide pans. This information is contained within the delay table 50 which is accessed by the control system 45.

An electronic eye 60 is positioned at a fixed position along the sorter conveyor 11 to input into the control system 45 the article placed upon the conveyor cart and the position of the cart relative to the system. Once the control system registers the position of the cart at a moment in time, it can then calculate the articles position at any later time by taking the position in combination with the speed of the sorter conveyor and the time since the fixed position was registered.

By way of example, a cart located at a fixed position at time 0 moving at 20 feet/second, is at a position 100 feet downstream 5 seconds later. The control system 45 contains the positions of every multi-cell chute along the length of the sorter conveyor and can calculate the time for any particular conveyor cart to reach any particular chute. In one preferred embodiment, the conveyor carts form a continuous loop around the conveyor system. By calculating the length of each cart, determining the position of each cart relative to the other carts, and counting a pulse after each cart passes the fixed position, the control system can determine the position of every cart on the conveyor system. By way of example, each cart is four feet in length and cart zero is at the fixed position at time zero. After three impulses have been recorded by the control system indicating that three carts have passed the fixed position, the control system can determine that cart zero is twelve feet downstream of the fixed position, cart one is eight feet downstream, etc. This method allows for the control system to determine the relative position of each cart on the conveyor system.

The control system 45 also contains a listing of the orders to be processed by the system and the location of the orders along the sorter conveyor. This information may be available in a tray look-up table that contains a tray number, a cell number sorting for the article, and the time before the conveyor cart reaches the cell. The control system monitors this information to ensure the articles are placed in the correct multi-cell chutes at the correct times for the orders to be accurately and timely filled. The control system registers an article placed upon a conveyor cart and determines which chute or chutes the article is needed to fill an order. The control system determines the first multi-cell chute that the cart will reach and whether the article can be discharged into the correct tote.

When the control system determines the conveyor cart can be discharged and the diverter door is in the proper position to guide the article to the proper tote, the system will actuate the cart and discharge the article. If the system determines that the article cannot be discharged at the closest needed chute because the diverter door is not in the correct orientation or the conveyor cart cannot be actuated in time to discharge the article into the multi-cell chute, the control system will determine the next multi-cell chute located downstream that requires the article and will discharge it at that chute. The system will continue the process of determining the next available multi-cell chute until each order is complete.

Certain modifications and improvements will occur to those skilled in the art upon a reading of the foregoing description. By way of example, the control system can use distance to track the position of the conveyor carts instead of a being a function of time. Additionally, the diverter doors can be more efficiently designed allowing them to swing faster thereby improving the speed of the conveyor system. It should be understood that all such modifications and improvements have been deleted herein for the sake of conciseness and readability but are properly within the scope of the following claims.

We claim:

1. A multi-cell discharge chute for a material handling system including a plurality of tilt trays, said chute comprising:

(a) a plurality of cells arranged generally perpendicular to the travel of the material handling system and aligned with respect to one another;

(b) a plurality of guide pans associated with each of said cells;

(c) a diverter door located between said material handling system and the inlet of each of said plurality of guide pans, said diverter door being movable between each of said inlets whereby said multi-cell discharge chute is operable to selectively discharge articles from said material handling system into each of said plurality of cells; and (d) a discharge control system interfaced with said material handling system for preventing said material handling system from discharging an article into more than one of said cells within a predetermined delay time thereby preventing said material handling system from discharging an article into a cell before said discharge chute is positioned with respect to said cell, wherein said discharge control system includes a delay look-up table, said delay look-up table including the times for said discharge chute to move between any two of said plurality of cells in either direction of movement; a tray status look-up table, said tray status look-up table including a tray number, a cell number associated with a destination of the article on said tray, and the time before said tray arrives at said cell; and a comparator connected between said delay look-up table and said tray status look-up table for comparing the times in each of said look-up tables with one another and providing a control signal when the time for said discharge chute to move to its next cell is greater than the time before said tray arrives at said cell.

2. The apparatus according to claim 1, wherein said delay look-up table including the times for said discharge chute to move between any two of said plurality of cells in either direction of movement and further includes an additional time correction factor dependent on the article speed moving on said chute.

3. A multi-cell discharge chute for a material handling system including a plurality of tilt trays, said chute comprising:

(a) at least three discharge cells arranged generally perpendicular to the travel of the material handling system and aligned with respect to one another, wherein said cells are vertical and wherein each of said cells includes a downwardly inclined slide and a hopper for containing discharged articles each of said hoppers including a bomb-bay door bottom for unloading to said hopper;

(b) a plurality of guide pans associated with each of said cells; and (c) a diverter door located between said material handling system and the inlet of each of said plurality of guide pans, said diverter door being movable between each of said inlets whereby said multi-cell discharge chute is operable to selectively discharge articles from said material handling system into each of said cells.

4. The apparatus according to claim 3, wherein each of said vertical discharge cells includes a hopper for containing discharged articles.

5. The apparatus according to claim 3, wherein said bomb-bay door bottoms for unloading said hopper are actuated together for de-coupled sorting.

6. The apparatus according to claim 3, wherein said bomb-bay door bottoms for unloading said hopper are actuated individually for coupled sorting.

7. The apparatus according to claim 3, wherein said cells are substantially horizontal discharge cells.

8. The apparatus according to claim 7, wherein said horizontal discharge cells includes an upwardly inclined slide attached to each of its respective guide pans.

9. The apparatus according to claim 7, wherein each of said horizontal discharge cells includes a stop at the end of said slide for containing discharged articles.

10. The apparatus according to claim 3, wherein said guide pans include an elongated fixed sheet supported by a pair of parallel sidewalls.

11. The apparatus according to claim 10, further including a transparent guard extending across said pair of parallel sidewalls above the surface of said guide pans for preventing lightweight articles from becoming airborne during discharge.

12. The apparatus according to claim 3, wherein said diverter door located between said material handling system and the inlets of each of said plurality of guide pans includes a pivotally attached slide surface and a multi-position actuator for moving said diverter door between each of said inlets whereby said multi-cell discharge chute is operable to selectively discharge articles from said material handling system into each of said cells.

13. The apparatus according to claim 12, wherein said pivotally attached slide surface includes a conduit cover for controlling the direction of movement of an article being discharged.

14. The apparatus according to claim 12, wherein said multi-position actuator is a tandem pneumatic cylinder.

15. The apparatus according to claim 14, wherein said tandem pneumatic cylinder includes an air cushion at each of the end stops to reduce noise created by the operation of the cylinder when the cylinder reaches the end of its stroke.

16. A multi-cell discharge chute for a material handling system including a plurality of tilt trays, said chute comprising:

(a) at least three cells arranged generally perpendicular to the travel of the material handling system and aligned with respect to one another;

(b) a plurality of guide pans associated with each of said cells;

(c) a diverter door located between said material handling system and the inlet of each of said plurality of guide pans, said diverter door being movable between each of said inlets whereby said multi-cell discharge chute is operable to selectively discharge articles from said material handling system into each of said cells;

(d) a discharge control system interfaced with said material handling system for preventing said material handling system from discharging an article into more than one of said cells within a predetermined delay time thereby preventing said material handling system from discharging an article into a cell before said discharge chute is positioned with respect to said cell, wherein said discharge control system includes a delay look-up table, said delay look-up table including the times for said discharge chute to move between any two of said plurality of cells in either direction of movement; a tray status look-up table, said tray status look-up table including a tray number, a cell number associated with a destination of the article on said tray, and the time before said tray arrives at said cell; and a comparator connected between said delay look-up table and said tray status look-up table for comparing the times in each of said look-up tables with one another and providing a control signal when the time for said discharge chute to move to its next cell is greater than the time before said tray arrives at said cell.

17. The apparatus according to claim 16, wherein said delay look-up table including the times for said discharge chute to move between any two of said plurality of cells in either direction of movement and further includes an additional time correction factor dependent on the article speed moving on said chute.

18. The apparatus according to claim 16, wherein said cells are substantially vertical discharge cells.

19. The apparatus according to claim 18, wherein said vertical discharge cells includes a downwardly inclined slide attached to each of its respective guide pans.

20. The apparatus according to claim 18, wherein each of said vertical discharge cells includes a hopper for containing discharged articles.

21. The apparatus according to claim 18, wherein each of said hoppers for containing discharged articles includes a bomb-bay door bottom for unloading said hopper.

22. The apparatus according to claim 21, wherein said bomb-bay door bottoms for unloading said hopper are actuated together for de-coupled sorting.

23. The apparatus according to claim 21, wherein said bomb-bay door bottoms for unloading said hopper are actuated individually for coupled sorting.

24. The apparatus according to claim 16, wherein said cells are substantially horizontal discharge cells.

25. The apparatus according to claim 24, wherein said horizontal discharge cells includes an upwardly inclined slide attached to each of its respective guide pans.

26. The apparatus according to claim 24, wherein each of said horizontal discharge cells includes a stop at the end of said slide for containing discharged articles.

27. The apparatus according to claim 16, wherein said guide pans include an elongated fixed sheet supported by a pair of parallel sidewalls.

28. The apparatus according to claim 27, further including a transparent guard extending across said pair of parallel sidewalls above the surface of said guide pans for preventing lightweight articles from becoming airborne during discharge.

29. The apparatus according to claim 16, wherein said diverter door located between said material handling system and the inlets of each of said plurality of guide pans includes a pivotally attached slide surface and a multi-position actuator for moving said diverter door between each of said inlets whereby said multi-cell discharge chute is operable to selectively discharge articles from said material handling system into each of said cells.

30. The apparatus according to claim 29, wherein said pivotally attached slide surface includes a conduit cover for controlling the direction of movement of an article being discharged.

31. The apparatus according to claim 29, wherein said multi-position actuator is a tandem pneumatic cylinder.

32. The apparatus according to claim 31, wherein said tandem pneumatic cylinder includes an air cushion at each of the end stops to reduce noise created by the operation of the cylinder when the cylinder reaches the end of its stroke.

* * * * *